United States Patent [19]

Lim et al.

[11] Patent Number: 5,612,261
[45] Date of Patent: Mar. 18, 1997

[54] SEALING GLASS COMPOSITION AND METHOD OF MAKING AND OF USING

[75] Inventors: Byung C. Lim, Kyungki-do; Tae H. Park, Seoul; Tae H. Park, Kyungki-do, all of Rep. of Korea

[73] Assignee: Samsung Corning Co., Ltd, Rep. of Korea

[21] Appl. No.: 520,985

[22] Filed: Jun. 23, 1995

[30] Foreign Application Priority Data

Jun. 24, 1994 [KR] Rep. of Korea ............. 94-14593

[51] Int. Cl.⁶ .................. C03C 10/02; C03C 8/24; C03C 3/074
[52] U.S. Cl. .................. 501/32; 501/15; 501/10; 501/76; 501/17; 501/18
[58] Field of Search .................. 501/10, 15, 32, 501/76

[56] References Cited

U.S. PATENT DOCUMENTS

| | | | |
|---|---|---|---|
| 3,121,628 | 2/1964 | Loehrke | 501/76 |
| 3,228,548 | 1/1966 | Butler | 501/76 |
| 4,099,977 | 7/1978 | Francel et al. | 501/76 |
| 4,131,478 | 12/1978 | Davis et al. | 501/76 |
| 4,246,034 | 1/1981 | Kellberg | 501/76 |
| 5,145,803 | 9/1992 | Daimer et al. | 501/15 |
| 5,470,804 | 11/1995 | Morena | 501/15 |

*Primary Examiner*—Mark L. Bell
*Assistant Examiner*—Louis M. Troilo
*Attorney, Agent, or Firm*—Finnegan, Henderson, Farabow, Garrett & Dunner, L.L.P.

[57] ABSTRACT

The present invention relates to a novel sealing glass composition, in particular, one which comprises solid PbO—ZnO—$B_2O_3$ glass and natural garnet as a filler component. This composition has the advantage that thermal strain does not occur at the interface between the crystalline glass and filler because of the excellent chemical affinity. This prevents cracks from propagating at the interface between the main glass and filler, thereby improving the mechanical strength of the glass.

3 Claims, No Drawings

5,612,261

SEALING GLASS COMPOSITION AND METHOD OF MAKING AND OF USING

BACKGROUND OF THE INVENTION

1. Technical Field

The present invention relates to a novel sealing glass composition, in particular, one which comprises solid PbO—ZnO—$B_2O_3$ glass and natural garnet as a filler component. This composition has the advantage that thermal strain does not occur at the interface between the crystalline glass and filler because of the excellent chemical affinity. This prevents cracks from propagating at the interface between the main glass and filler, thereby improving the mechanical strength of the glass.

2. Description of Related Prior Art

Crystalline sealing glass compositions used for sealing panels and funnels of TV Braun tubes are known. U.S. Pat. No. 4,131,478 and Japanese Patent Unexamined Publication No. 64-014128, the disclosures of which are hereby incorporated by reference, disclose PbO—ZnO—$B_2O_3$ glass with $Al_2O_3$ added as a filler component. The composition has a similar thermal expansion coefficient as the panel and funnel of a TV Braun tube over 25 inches in size. The composition also has a high strength at a usage near 440° C. However, since $Al_2O_3$ is used as a filler component, a thermal strain occurs at the interface between the main glass and filler due to a large difference between the thermal expansion coefficient of the main glass and filler (the coefficient for the main glass is $105 \times 10^{-7}$/° C. and for the filler is $65 \times 10^{-7}$/° C.). $Al_2O_3$, having a chemical stability, does not closely adhere at the interface with main glass component, so the adhesive strength suitable for sealing glass is limited because of the low resistance for crack propagation at the interface. Another problem is that the $Al_2O_3$ component is very expensive due to the required particle size of 1–50 μm needed for suitable properties as a filler.

Korean Pat. Unexamined Publication No. 92-635, the disclosure of which is incorporated herein by reference, discloses a crystalline sealing glass composition with a high mechanical strength. The composition consists of a crystalline PbO—ZnO—$B_2O_3$ sealing glass powder and $Al_2O_3$—$ZnO_2$ filler, flowed by heat-treatment for a short time to give properties suitable for a sealing glass for a TV Braun tube. However, this composition has a problem in that a synthetic process is specially required due to the use of $Al_2O_3$—$ZnO_2$ as the filler component. Another problem is that thermal strain occurs at the interface between the main glass and filler due to the different thermal expansion coefficients of the main glass and filler.

In order to solve the above problems, the present invention uses garnet ($Fe_3Al_2Si_3O_2$, thermal expansion coefficient of $85 \times 10^{-7}$/° C.) as a filler component, with a thermal expansion coefficient higher than $Al_2O_3$, combined with PbO—ZnO—$B_2O_3$ as the main glass to essentially prevent crack propagation at the interface between the main glass and filler because of the excellent chemical affinity. The composition may be used for sealing panels and funnels for large CTV over 25 inches in size.

SUMMARY OF THE INVENTION

The object of the present invention is to provide a sealing glass composition having excellent properties, such as mechanical strength. The excellent properties are achieved by preventing crack propagation owing to excellent chemical affinity, when the garnet as a filler component is added in crystalline PbO—ZnO—$B_2O_3$ glass.

The present invention is directed to a sealing glass composition consisting of crystalline glass powder and a filler, wherein the composition consists of: 89 to 98 wt % of a crystalline glass powder consisting of 70 to 87 wt % PbO, 6 to 15 wt % $B_2O_3$, 2 to 12 wt % ZnO, a 0.1 to 5 wt % mixture of $SiO_2$ and $Al_2O_3$, 0 to 3 wt % BaO; 0 to 1 wt % of zircon; and 1 to 10 wt % garnet.

DETAILED DESCRIPTION OF THE INVENTION

The sealing glass composition according to the present invention consists of a PbO—ZnO—$B_2O_3$ glass powder, a small amount of a nucleating agent, and garnet as a filler component. The composition has a high adhesion because thermal strain does not occur between the main glass and filler interface and cracks do not substantially propagate at the interface.

In the present invention, if the content of PbO in the crystalline main glass powder is less than 70 wt %, the glass transition temperature is too high and so the sealing temperature of the panel and funnel glass of the CTV is increased. If the content of PbO is more than 87 wt %, the thermal expansion coefficient of glass is increased. If the content of $B_2O_3$ is more than 15 wt %, the glass transition temperature is too high. If the content of $B_2O_3$ is less than 6 wt %, transparency loss occurs during the glass melting process. If the total content of $SiO_2$ and $Al_2O_3$ is less than 0.1 wt %, the strength of the glass may be decreased. If the total content of $SiO_2$ and $Al_2O_3$ is more than 5 wt %, the melting point of the glass is too high. BaO is used below 3 wt % in order to decrease the melting point of glass.

If the content of garnet power used as a filler component is less than 1 wt %, the strength increasing effect is too low. Conversely, if the content of garnet is more than 10 wt %, the sealing properties are worse due to a low fluidity and cracks may occur due to the difference of the thermal expansion coefficients after sealing the panels and funnels of the TV Braun tubes.

As described above, since the garnet is used as a filler component and the components and their ratios for the glass composition and filler are different than what is known in the prior art, the composition of the present invention has a higher strength than the prior art strength of below 500 kg/cm². Therefore, this composition may be effectively used for sealing panels and funnels of large-size CTV above 25 inches in size.

The present invention is illustrated by the following detailed examples. However, the present invention is not limited to these examples.

EXAMPLES 1 to 3 and COMPARATIVE EXAMPLE

Crystalline glass powder compositions comprising PbO, ZnO, $B_2O_3$, $SiO_2$, $Al_2O_3$ and BaO were prepared as shown in following Table. These compositions were melted in a platinum crucible at 1000° C. for 30 minutes, and the melted compositions were respectively used to form a molded plate. The molded plate was ground by ball-mill for 80 minutes to obtain a crystalline glass powder and passed through a 150 mesh sieve.

Garnet raw stones having an average diameter of 1 mm were ground in a ball-mill for 90 minutes to obtain a powder and passed through a 230 mesh sieve. The garnet powder is used as the filler component.

The prepared glass powder and filler were respectively measured by weight according to the ratio on Table and mixed to obtain the crystalline glass sealing compositions.

The glass transition temperature and the curve strength of the obtained crystalline glass powder were measured. The results are as shown in the Table.

In these tests, the transition temperature was measured by DSC (Differential Scanning Calorimeter). The bend strength is the average value measured by following method. Each sample was press-molded by rectangular mold (40×10×10 mm) and heat-treated for 40 minutes at 440° C., polished by sand paper (#1000) to prepare a sample 40×10×5 mm in size, and the bending strength for the sample was measured 12 times by UTM (Universal Test Machine).

TABLE

| Section | Example 1 | Example 2 | Example 3 | Comparative Example (Prior Art) |
|---|---|---|---|---|
| Sealing Composition | | | | |
| Glass powder composition (wt %) | PbO: 75 ZnO: 12 $B_2O_3$: 9 $SiO_2$: 2 BaO: 2 | PbO: 75 ZnO: 12 $B_2O_3$: 9 $SiO_2$: 2 BaO: 2 | PbO: 84 ZnO: 8 $B_2O_3$: 7 $SiO_2$: 1 | PbO: 75 ZnO: 12 $B_2O_3$: 9 $SiO_2$: 2 BaO: 2 |
| Content of glass powder | 98.5 | 97.0 | 94.5 | 99.5 |
| Nucleating agent (Zircon, wt %) | 0.5 | 0.5 | 0.5 | 0.5 |
| Garnet filler (wt %) | 1 | 2.5 | 5 | 0 |
| Glass Transfer Point °C. | 320 | 320 | 310 | 320 |
| Adhesive Time (min) | 30–40 | 30–40 | 30–40 | 30–40 |
| Bending Strength (Kg/cm$^3$) | 500 | 550 | 590 | 450 |

As indicated above, the sealing glass composition according to the present invention attains the following merits by use of garnet filler with a crystalline PbO—ZnO—$B_2O_3$ main glass: the thermal strain does not occur at the interface between the crystalline glass and filler, the crack propagation may essentially be prevented at the interface owing to the excellent chemical affinity between the main glass and filler, this composition may effectively be used for sealing panels and funnels on large-size CTV above 25 inches in size, and the sealing glass composition may economically be provided by use of raw garnet as the filler component.

What is claimed is:

1. A sealing glass composition comprising a crystalline glass powder and a filler, wherein the composition is comprised of:

89 to 98 wt % of a crystalline glass powder consisting of 70 to 87 wt % PbO, 6 to 15 wt % $B_2O_3$, 2 to 12 wt % ZnO, and 0.1 to 5 wt % mixture of $SiO_2$ and $Al_2O_3$, 0 to 3 wt % BaO;

0 to 1 wt % of zircon; and 1 to 10 wt % garnet.

2. The sealing glass composition of claim 1, wherein the bending strength is greater than 500 Kg/cm$^3$.

3. A method for making a crystalline glass composition comprising:

(a) melting a glass composition comprising PbO, ZnO, $B_2O_3$, $SiO_2$, $Al_2O_3$, and BaO, (b) forming a molded plate from the melted glass composition, (c) grinding the molded plate to form a glass powder, (d) grinding garnet raw stones to form a filler powder, and (e) adding the filler powder and a zircon nucleating agent to the glass to form a sealing glass composition comprising a crystalline glass powder and a filler, wherein the composition is comprised of: 89 to 98 wt % of a crystalline glass powder consisting of 70 to 87 wt % PbO, 6 to 15 wt % $B_2O_3$, 2 to 12 wt % ZnO, and 0.1 to 5 wt % mixture of $SiO_2$ and $Al_2O_3$, 0 to 3 wt % BaO; 0 to 1 wt % of zircon; and 1 to 10 wt % garnet.

* * * * *